J. C. & J. A. DORAN.

JEWELRY COMPONENT.

APPLICATION FILED JUNE 1, 1908.

12,888.

Reissued Nov. 24, 1908.

Witnesses

C. N. Walker

Lillie M. Perry.

Inventors

James C. Doran

James A. Doran by Wm. H. Fuchel

Attorney

UNITED STATES PATENT OFFICE.

JAMES C. DORAN AND JAMES A. DORAN, OF PROVIDENCE, RHODE ISLAND.

JEWELRY COMPONENT.

No. 12,888. Specification of Reissued Letters Patent. Reissued Nov. 24, 1908.

Original No. 767,687, dated August 16, 1904, Serial No. 206,108. Application for reissue filed June 1, 1908. Serial No. 436,168.

*To all whom it may concern:*

Be it known that we, JAMES C. DORAN and JAMES A. DORAN, both citizens of the United States, residing at Providence and formerly at Pawtucket, in the county of Providence and State of Rhode Island, have invented a certain new and useful Improvement in Jewelry Components, of which the following is a specification, reference being had therein to the accompanying drawings.

Our invention relates to that class of jewelry components which are applicable to and form parts of brooches, breastpins, and similar articles.

It is the universal custom of jewelers to purchase pin-tongues and joints and apply the same to whatever ornamental body they desire. A minimum of pieces to be applied, therefore, is a desideratum because of the time and expense saved thereby. Furthermore, the use of structures involving pintles and their equivalents besides increasing expense of manufacture is unsatisfactory because of the weakness of the parts occasioned by the bearing-perforations.

To the end of obviating the above-mentioned defects and attaining the enumerated advantages, our invention consists in the novel construction and combination of parts hereinafter described, and illustrated in the accompanying drawings, wherein—

Figure 1:
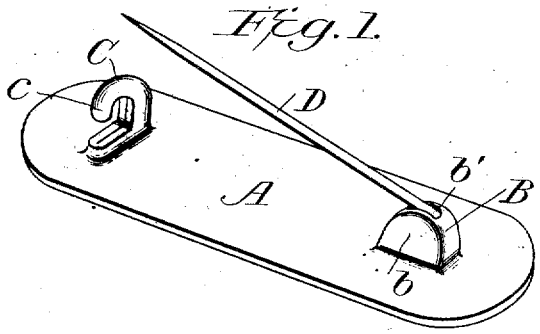
Figure 2:
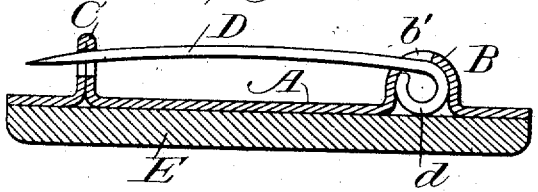
Figure 3:
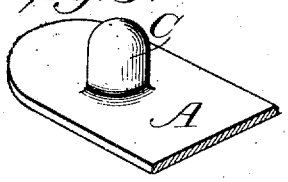
Figure 4:
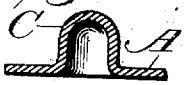
Figure 5:
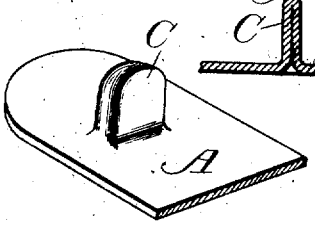
Figure 6:
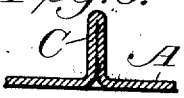
Figure 7:
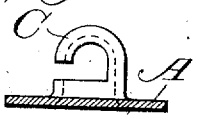
Figure 8:
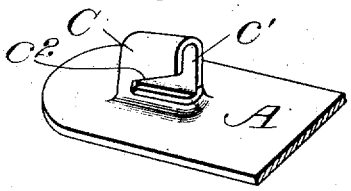

Figure 1 is a perspective view of our new component, and Fig. 2, a central longitudinal section of the same applied to a base or body. Fig. 3 is a perspective view of part of the back plate showing a hollow projection cupped up therein and illustrating a rudimentary form of both the pin-tongue housing and the catch; Fig. 4, a central longitudinal section of the same, and Fig. 5 is a perspective of the same after the flattening operation for forming the catch. Fig. 6 is a central longitudinal section of the parts shown in Fig. 5. Fig. 7 is an end elevation of the completed catch. Fig. 8 is a perspective of a modified form of catch.

Similar reference-letters indicate like parts throughout the views.

Our improved component comprises a back plate A, of sheet metal, provided with an integral hollow projection B, having upright parallel side walls $b$ and an oblong segmental opening or slot $b'$ in the portion connecting the side walls. This part B constitutes the housing for the pin-tongue head.

The catch is formed by punching a hollow projection C in the plate A, as shown in Figs. 3 and 4. This projection is then flattened to the form shown in Figs. 5 and 6. The flattened projection is next transversely cut by suitable dies into a hook form $c$, which completes the catch member.

A modified form of our catch is shown in Fig. 8. This catch, as is the other form described, is formed from a hollow projection, C, and is flattened somewhat by suitable dies, having a portion of one of its narrowest sides removed to form the opening $c'$ and provided also with an adjacent horizontal opening $c^2$ in one side to allow ingress and egress of the pin-tongue point. This construction provides a safety catch or guard.

Mounted in the housing B and contacting with the side walls thereof is the head $d$ of the pin-tongue D. While the head is illustrated herein with a transverse opening, the latter is not necessary, as an imperforate head may be used, it being only essential that the head be not spherical and provided the head be not smaller than the slot $b'$.

It is to be noted, first, that the hollow projections are not only integral with the back-plate, but that they are seamless and hence possess a maximum of strength, and second, that the stock of the back-plate entirely surrounds these projections and thus adds to their strength and affords an extended base all about them for the attachment of the ornamental body or face-plate.

Our component is utilized by fixing the plate A in any suitable manner to the ornamental body or face-plate E, which forms a bearing for the lower portion of the head $d$.

It will be further noted concerning our invention that the existence of the slot $b'$ in the forward upper portion of the housing B affords a bearing not only for the downward travel of the pin-tongue D, but also, as regards its interior margin, for the head of the pin-tongue $d$, and further serves as a back-stop to limit the upward movement of the pin-tongue.

Having described our invention, what we claim is:—

1. A jewelry component, consisting of a back-plate having an integral hollow projection provided with flattened sides and with an opening in the portion between said sides.

2. A jewelry component, consisting of a back-plate having near its opposite ends integral seamless hollow projections surrounded on all sides by the back-plate and provided with flattened sides, one of said projections having a segmental slot in the portion between its sides and the other having a portion of one of its narrowest sides removed and a horizontal opening thereinto.

3. In a device of the character described, the combination with a face-plate, of a back-plate fixed thereto and having integral therewith a hollow projection provided with flattened sides, an intermediate connecting portion and an opening in said connecting portion.

4. In a device of the character described, the combination with a face-plate of a back-plate fixed thereto and having integral therewith a hollow projection provided with flattened sides and with a segmental slot.

5. In a device of the character described, the combination with a face-plate of a back-plate fixed thereto and having integral therewith a pin catch and a pin housing, which housing is composed of a hollow projection provided with flattened sides, a portion connecting said sides and a segmental slot in said connecting portion.

6. In a device of the character described, the combination with a face-plate, of a back-plate fixed thereto and having integral therewith a hollow projection provided with flattened sides and with a segmental slot and a pin-tongue provided with a flat circular head mounted in said projection and bearing upon the flattened sides thereof, the pin-tongue also bearing in its extremes of movement upon opposite ends of the slot.

7. In a device of the character described, the combination with a face-plate, of a back-plate fixed thereto and having integral therewith a hollow projection provided with flattened sides and with a segmental slot and a pin-tongue provided with a flat circular head mounted in said projection and supported therein by the face-plate.

8. In a device of the character described, the combination with a face-plate, of a back-plate fixed thereto and having integral therewith a hollow projection provided with flattened sides and a segmental slot and a pin-tongue provided with a flat circular head mounted in said projection and bearing upon the flattened sides thereof.

9. In a device of the character described, the combination with a face-plate, and a back-plate fixed thereto and having integral therewith a hollow projection provided with flattened sides and a segmental slot, of a pin-tongue provided with a flat circular head mounted in the projection and bearing upon its sides, said back-plate also having integral therewith a hollow projection with flattened sides and having an opening in one of its narrowest sides and a horizontal slot and serving as a safety catch to receive the point of the pin-tongue.

10. In a device of the character described, the combination with a face-plate, and a back-plate fixed thereto and having integral therewith a hollow projection provided with flattened sides and a segmental slot, of a pin-tongue provided with a flat circular head mounted in the projection and bearing upon its sides, said back-plate also having integral therewith a hollow projection cut out to receive and inclose the point of the pin-tongue.

In testimony whereof we have affixed our signatures in presence of two witnesses.

JAMES C. DORAN.
JAMES A. DORAN.

Witnesses:
JOSEPH G. DORAN,
FRED A. TINKHAM.